United States Patent Office 2,910,353
Patented Oct. 27, 1959

2,910,353

METHOD FOR REDUCING GROWTH OF WEEDS

Willard B. Jordan, Baldwin, Md., assignor to Olin Mathieson Chemical Corporation, a corporation of Virginia No Drawing. Application August 26, 1954
Serial No. 452,451

2 Claims. (Cl. 71—2.3)

This invention relates to a novel method for the selective control of the growth of plants.

More particularly, my invention relates to a method in which 2,4-dichloro-6-nitrophenol and compositions containing this compound is used as a herbicide for weeds and grasses, at the same time permitting the growth of valuable crops. Thus, the method of my invention comprises the application of 2,4-dichloro-6-nitrophenol to the soil as a pre-emergence herbicide. This permits the growth of valuable crops such as corn, wheat, soya beans and cotton, while preventing the growth of weeds, such as rye grass, crab grass, pigweed and mustard. The rate of application of the 2,4-dichloro-6-nitrophenol will generally vary from about 5 to 25 pounds per acre, about 10 to 20 pounds per acre usually giving very effective results.

2,4-dichloro-6-nitrophenol is a yellow solid which melts at 122–3° C. and which is further described in Beilstein, 6, 241. When used for the purposes of my invention, the compound can be formulated and applied in accordance with procedures which are well understood in the art. For example, the 2-4-dichloro-6-nitrophenol can be admixed with a liquid or, when finely ground, it can be admixed with a solid diluent. Suitable concentrates can be prepared which can be further diluted before application to the soil. Thus, concentrated solutions in acetone, cyclohexanone or aromatic petroleum oils such as Sovacide F can be prepared, if desired. Preferably such concentrated solutions will also contain suitable emulsifying agents such as Tween No. 20 (a proprietary polyoxyalkylene derivative of sorbitan monolaurate) or Triton NE (a proprietary polyoxyethylene alkylphenol ether). These concentrated solutions can be mixed with water to form suspensions or emulsions which are suitable for application to the soil by spraying.

Alternatively, the finely divided dichloronitrophenol can be admixed with finely divided diluents, for example, attapulgite, Celite, finely divided talc, bentonite, pyrophyllite, calcium carbonate or the like. When used as a spray in aqueous solution or suspension, such solid admixtures will advantageously contain also a wetting agent, for example, an alkyl aryl sulfonate such as sodium decyl benzene sulfonate, sodium dipropyl naphthalene sulfonate or sodium butyl naphthalene sulfonate, a fatty alcohol sulfate such as sodium dodecyl sulfate, a long chain quaternary ammonium compound or a sodium salt of a petroleum-derived alkyl sulfonic acid.

The following examples illustrate in detail how the 2,4-dichloro-6-nitrophenol can be employed in accordance with my invention and also illustrate how the composition can be formulated. As will be apparent to those skilled in the art, other methods of application and formulations are also suitable.

EXAMPLE I

Test plots were prepared in shallow boxes measuring 14 by 28 by 3½ inches. These plots were planted with seeds of a single species of plant (grass, weeds or crops) and passed by means of a moving belt under a spray which applied a solution composed of 0.4 pound of 2,4-dichloro-6-nitrophenol or other chemical herbicide per gallon of acetone to each plot uniformly. The rate of application was equivalent to 16 pounds of the dichloronitrophenol per acre. After six weeks in the greenhouse, the plots were examined and the proportion of growth recorded. The results of the tests are set forth in Table I below. In that table 0 indicates that the chemical had no effect on growth and 10 indicates that the chemical completely killed all of the plants in the entire plot. Thus, a value of 9 indicates that 90 percent of the area of the plot contained no growing plants.

*Table I*

| Compound | Rye Grass | Crab Grass | Pigweed | Mustard | Total | Corn | Cotton | Wheat | Soy Bean | Total |
|---|---|---|---|---|---|---|---|---|---|---|
| 2,4-Dichloro-6-nitrophenol | 9 | 9 | 10 | 10 | 38 | 0 | 0 | 2 | 1 | 3 |
| Diethylene glycol di(2,4-dichlorophenoxyacetate) | 4 | 3 | 9 | 9 | 25 | 4 | 5 | 1 | 3 | 13 |
| 2-Chloroethyl-2,4-dichlorophenoxyacetate | 8 | 8 | 9 | 9 | 34 | 8 | 9 | 2 | 9 | 28 |
| 2,4,5 - Trichlorophenoxyethoxyethyl - 2,4 - dichlorophenoxyacetate | 9 | 1 | 8 | 6 | 24 | 2 | 7 | 10 | 1 | 20 |
| Sodium trichloroacetate | 0 | 0 | 0 | 0 | 0 | 1 | 1 | 1 | 0 | 3 |
| Alkanolamine salts of dinitro-o-sec.-butylphenol | 6 | 5 | 8 | 10 | 29 | 0 | 0 | 0 | 0 | 0 |
| iso-Propyl-N-(3-chlorophenyl) carbamate | 9 | 9 | 9 | 9 | 36 | 2 | 0 | 0 | 2 | 4 |

It will be noted that three of the chemicals tested were 2,4-dichlorophenoxyacetate derivatives and they showed only a slight selectivity for the weeds as compared with the crops. Sodium trichloroacetate was substantially inactive as a herbicide. The salts of dinitrophenol and isopropyl chlorophenyl carbamate showed the desired type of selective herbicidal action in being effective against the weeds but permitting the growth of the crops. However, the 2,4-dichloro-6-nitrophenol used in accordance with my invention is more selective than the two preceding compounds, both of which are commercially available for this purpose.

EXAMPLE II

In order to prepare a wettable powder suitable for use in accordance with my invention when diluted with from 200 to 500 parts by weight of water, 4 parts by weight of 2,4-dichloro-6-nitrophenol, 0.5 part by weight of finely divided talc (350 mesh) and 0.5 part by weight of Carbowax 4000 (a proprietary non-volatile, solid polyethylene glycol which is hard and waxy in nature, has a specific gravity of 1.2, a freezing range of 50–55° C., a flash point above 475° F. and a Saybolt viscosity at 210° F. of 500–700 seconds) are intimately admixed.

EXAMPLE III

An aerosol suitable for use in accordance with my invention can be prepared by dissolving one part by weight of 2,4-dichloro-6-nitrophenol in a mixture composed of 89 parts by weight of dichlorodifluoromethane and 10 parts by weight of cyclohexanone.

EXAMPLE IV

An emulsifiable concentrate suitable for use in accordance with my invention when diluted with 50 parts by weight of water per part of concentrate is composed of an admixture of one part by weight of 2,4-dichloro-6-nitrophenol and 10 parts by weight of Tween No. 20.

I claim:

1. A method for reducing the growth of weeds and grasses among growing crops which comprises applying to the soil prior to the emergence of the said weeds, grasses and crops 2,4-dichloro-6-nitrophenol in amount effective to substantially reduce the growth of the weeds and grasses.

2. A method according to claim 1 in which the rate of application of the 2,4-dichloro-6-nitrophenol to the soil is from about 5 to about 25 pounds per acre.

References Cited in the file of this patent

UNITED STATES PATENTS

| 2,344,063 | Schotte | Mar. 14, 1944 |
| 2,410,281 | Fletcher | Oct. 29, 1946 |

FOREIGN PATENTS

| 896,478 | France | May 2, 1944 |

OTHER REFERENCES

Comptes Rendus des Séances de l'Académie des Sciences, vol. 216 (1943), pages 79 to 81.